United States Patent
Bish

(10) Patent No.: US 12,281,224 B2
(45) Date of Patent: Apr. 22, 2025

(54) FLUOROELASTOMER COMPOUNDS

(71) Applicant: E I DU PONT DE NEMOURS AND COMPANY, Wilmington, DE (US)

(72) Inventor: Christopher J. Bish, Kennett Square, PA (US)

(73) Assignee: DUPONT POLYMERS, INC., Wilmington, DE (US)

(*) Notice: Subject to any disclaimer, the term of this patent is extended or adjusted under 35 U.S.C. 154(b) by 0 days.

(21) Appl. No.: 16/317,911

(22) PCT Filed: Aug. 9, 2017

(86) PCT No.: PCT/US2017/046030
§ 371 (c)(1),
(2) Date: Jan. 15, 2019

(87) PCT Pub. No.: WO2018/038917
PCT Pub. Date: Mar. 1, 2018

(65) Prior Publication Data
US 2021/0292534 A1    Sep. 23, 2021

Related U.S. Application Data

(60) Provisional application No. 62/379,713, filed on Aug. 25, 2016.

(51) Int. Cl.
| | |
|---|---|
| *C08L 27/18* | (2006.01) |
| *C08K 3/04* | (2006.01) |
| *C08K 3/22* | (2006.01) |
| *C08K 3/30* | (2006.01) |
| *C08K 5/25* | (2006.01) |
| *C08L 27/20* | (2006.01) |
| *C08L 29/10* | (2006.01) |

(52) U.S. Cl.
CPC .............. *C08L 27/18* (2013.01); *C08K 3/04* (2013.01); *C08K 3/22* (2013.01); *C08K 3/30* (2013.01); *C08K 5/25* (2013.01); *C08L 27/20* (2013.01); *C08L 29/10* (2013.01); *C08K 2003/2241* (2013.01); *C08K 2003/3045* (2013.01); *C08K 2201/005* (2013.01)

(58) Field of Classification Search
CPC ............ C08L 27/18; C08L 27/20; C08K 3/04
See application file for complete search history.

(56) References Cited

U.S. PATENT DOCUMENTS

| | | |
|---|---|---|
| 5,444,116 A | 8/1995 | Amin et al. |
| 5,696,189 A | 12/1997 | Legare |
| 6,114,452 A * | 9/2000 | Schmiegel ............... C08F 8/00 525/218 |
| 6,191,208 B1 | 2/2001 | Takahashi |
| 6,281,296 B1 | 8/2001 | MacLachlan et al. |
| 6,638,999 B2 | 10/2003 | Bish et al. |
| 7,098,270 B2 | 8/2006 | Hochgesang et al. |
| 7,514,506 B2 | 4/2009 | Mansfield et al. |
| 8,288,005 B2 | 10/2012 | Manzara et al. |
| 2002/0026014 A1 | 2/2002 | Bish et al. |
| 2004/0019153 A1 | 1/2004 | Coughlin et al. |
| 2006/0034828 A1 | 2/2006 | Gerngross et al. |
| 2006/0201613 A1 | 9/2006 | Minowa et al. |
| 2008/0023000 A1 * | 1/2008 | Fenn ................... B65D 83/752 128/200.23 |

FOREIGN PATENT DOCUMENTS

| | | |
|---|---|---|
| EP | 0110420 B1 | 10/1986 |
| EP | 1566582 A1 | 8/2005 |
| EP | 1591479 A1 | 11/2005 |
| EP | 3504269 A1 | 7/2019 |
| JP | 2019-531369 A | 10/2019 |
| WO | 2018/038917 A1 | 3/2018 |

OTHER PUBLICATIONS

Extended European Search Report in EP Application 17844117.6, Issued Mar. 20, 2020.
International Search Report issued in International Application No. PCT/US2017/046030, Nov. 17, 2017.

* cited by examiner

*Primary Examiner* — Wenwen Cai
(74) *Attorney, Agent, or Firm* — Matthew T. Fewkes

(57) ABSTRACT

The present invention is directed to perfluoroelastomer compounds comprising carbon black having a particle size of 100 nm or greater; a mineral filler selected from the group consisting of titanium dioxide, barium sulfate, or a combination of these; a cure site monomer; and a curing agent. These perfluoroelastomer compounds, when cured into articles, exhibit desirable compression stress relaxation properties.

7 Claims, No Drawings

FLUOROELASTOMER COMPOUNDS

Described herein are perfluoroelastomer compounds (also called curable compositions), and expressly including perfluoroelastomer compounds with a nitrile cure site, and containing a combination of mineral fillers and carbon blacks. Also described herein are articles cured from these compounds.

Elastomer compounds that comprise a fluoroelastomer have achieved outstanding commercial success because they can be used in severe environments, in particular, during exposure to high temperatures and to aggressive chemicals. For example, these compounds are used in seals in hot or otherwise sections of aircraft engines, in oil-well drilling devices, as sealing elements in industrial equipment that operate at high temperatures, and in high temperature, high pressure, aqueous environments.

The properties of cured elastomer compounds arise largely because of the stability and inertness of the copolymerized fluorinated monomers that make up the major portion of the polymeric backbone of these compounds. Such monomers include tetrafluoroethylene and perfluoro (alkyl vinyl) ethers. In order to develop elastomeric properties fully, fluoroelastomers are typically crosslinked, i.e., vulcanized or cured. To this end, a small percentage of cure site monomer is copolymerized with the monomers. Upon crosslinking, the cure site monomers react with a curing agent to form a crosslinked elastomer entity in the form of an article. Cure site monomers described herein include cure site monomers comprising nitrile groups or halogen containing cure site monomers, preferably nitrile containing cure site monomers. Perfluoroelastomers comprising cure site monomers may be cured by any curative suitable for use with a nitrile group or halogen containing cure site monomer.

Described herein are perfluoroelastomer compounds comprising a combination of specific carbon blacks and mineral fillers, as well as articles including these compounds, which exhibit improved compression stress relaxation.

DETAILED DESCRIPTION OF THE INVENTION

Abbreviations

The claims and description herein are to be interpreted using the abbreviations and definitions set forth below:
"h", "hrs" refers to hours.
"N" refers to Newtons.
"%" refers to the term percent.
"parts" refers to parts by weight.
"phr" refers to parts per hundred parts of perfluoroelastomer (rubber): one of skill in the art uses and recognizes this term of measurement. For example, 3 parts of a component per 100 parts perfluoroelastomer is written as 3 phr. In the compounds, processes, and articles described herein, phr is based on 100 parts of perfluoroelastomer A.

Definitions

As used herein, the term "article" refers to a cured or partly cured item, thing, object, or an element. As used herein, when an article is partly cured, the term "article" may refer to any item, thing, object, element, device, etc. that has a form, shape, configuration that may undergo further curing, in order to become a cured article. When an article is partly cured, the term "preform" may refer to that form, shape, configuration, any part of which may undergo further curing.

As used herein, when an article is cured, the term "article" refers to an item, thing, object, element, device, etc. that is in a form, shape, configuration that is suitable for a particular use/purpose without further curing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the term "alkoxy" or "alkoxyl" refers to alkyl groups attached to an oxygen atom by a single bond. The other bond of the oxygen atom is connected to a carbon atom. Examples include methoxy, ethoxy, propoxy, isopropoxy, cyclopropyloxy, and cyclohexyloxy.

As used herein, the term "alkyl" includes linear, branched, or cyclic hydrocarbon structures and combinations of these. Alkyl does not include aromatic structures. Examples of linear alkyl groups include methyl, ethyl, propyl, butyl, pentyl, and hexyl groups. Branched alkyl groups include for example s- and t-butyl, and isopropyl groups. Examples of cyclic hydrocarbon groups include cyclopropyl, cyclopentyl, cyclohexyl, cyclobutyl, and cyclooctyl groups. Examples include methoxy, ethoxy, propoxy, isopropoxy, cyclopropyloxy, and cyclohexyloxy.

As used herein, the term "compound" refers to a composition that is able to be cured, i.e., a curable composition, as well as to a mixture of chemical entities that comprises at least a perfluoroelastomer and a curing agent. The mixture of chemical entities has not been cured nor has undergone processing conditions that would cause the curing of the mixture of chemical entities to undergo curing.

As used herein, the term "perfluoroelastomer" refers to a chemical entity which comprises mainly carbon and fluorine atoms. Perfluoroelastomers may comprise other atoms, for example but not limited to, oxygen and nitrogen atoms and optionally up to about 0.5 weight percent hydrogen atoms.

As used herein, the term "cured" refers to that resultant entity that comprised a perfluoroelastomer and which has been exposed to those conditions that caused the perfluoroelastomer molecules to form sufficient crosslinks among themselves (that is, curing conditions) such that the resultant entity takes on a form or shape or configuration or structure that cannot be further molded, extruded, or reshaped into a different one. That is, once a resultant entity which comprised a fluoroelastomer has been exposed to curing conditions to thereby be cured, that entity cannot be re-cured to take on a substantially different form or shape or configuration or structure. Cured articles of compounds comprising a fluoroelastomer include, but are not limited to, O-rings, seals, diaphragms, tubing, and gaskets.

To the point, a perfluoroelastomer compound may be initially cured to achieve a form, shape, etc. which cannot subsequently be reshaped or reformed into a different form or shape. The cured perfluoroelastomer compound may be further subjected to additional curing conditions, which provide additional, subsequent curing of the initial form or shape. Such additional curing conditions may be variously termed herein either as "curing" or as "post-curing". That is, the terms "curing", "cured" refer to both an initial curing process that results in a first cured, resultant entity having a form or shape and also expressly refer to any subsequent curing process that results in a subsequently cured entity which has the same form or shape as the initially cured entity.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. The perfluoroelastomer compounds, processes and articles described herein are not limited to specific values disclosed in defining a range in the description.

The disclosure herein of any variation in terms of materials, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including co-agents of a formula, the chemical structure takes precedence over the chemical name. And, if there are errors in the chemical structures of any chemical species described herein, the chemical structure of the chemical species that one of skill in the art understands the description to intend prevails.

Generally

Described herein are perfluoroelastomer compounds comprising a combination of a specific mineral filler and carbon black which, when cured, exhibit improved sealing force as measured by compression stress relaxation testing compared to an identical perfluoroelastomer compound but lacking said mineral filler. Further, the present invention is directed to articles prepared by curing the perfluoroelastomer compounds described herein and processes for preparing the perfluoroelastomer compounds described herein.

More specifically, the perfluoroelastomer compounds described herein comprise:
- A. a perfluoroelastomer comprising copolymerized units of:
  (1) tetrafluoroethylene, hexafluoropropylene, or a mixture of these;
  (2) at least one perfluoro (alkyl vinyl) ether, perfluoro (alkoxy vinyl) ether, or a mixture of these; and
  (3) one or more cure site monomers comprising a functional group selected from the group consisting of nitrile groups, bromine atoms, and iodine atoms.
- B. at least one carbon black having a particle size of at least 60 nm:
- C. a mineral filler selected from the group consisting of titanium dioxide, barium sulfate, or a mixture of these; and
- D. a curing agent:

wherein said perfluoroelastomer compound in the shape of an O-ring, after curing and exposure to distilled water at 225° C. and 20 percent compression for 1500 hours using Wykeham-Farrence testing equipment, exhibits a sealing force retention measured at 90° C. which is at least 25 percent greater than an identical perfluoroelastomer compound lacking said mineral filler.

The perfluoroelastomer compounds described herein, after curing, exhibit a sealing force of at least 20 N when measured at 90° C. after 1100 hrs exposure in water at 225° C. and 20 percent compression using Wykeham-Farrence testing equipment.

The processes described herein are directed to a mixture of a perfluoroelastomer, titanium dioxide, barium sulfate or a mixture of barium sulfate and titanium dioxide, along with at least one carbon black having a particle size of at least 60 nm and a curing agent. The processes include the step of curing a perfluoroelastomer compound comprising A) a perfluoroelastomer: B) at least one carbon black having a particle size of at least 60 nm: C) titanium dioxide, barium sulfate, or a combination of these; and D) a curing agent: wherein said perfluoroelastomer compound, in the shape of an O-ring, after curing and exposure to distilled water at 225° C. and 20 percent compression for 1500 hours using Wykeham-Farrence testing equipment, exhibits a sealing force retention measured at 90° C. which is at least 25 percent greater than an identical perfluoroelastomer compound lacking said mineral filler.

Also described herein are articles that have been prepared by curing the perfluoroelastomer compounds described herein.

Variations in the perfluoroelastomer compounds, articles, and processes for curing perfluoroelastomer compounds described herein may expressly include any of the following elements or any combination of the following elements. That is, it is expressly contemplated that the perfluoroelastomer compounds, articles and processes described herein and recited in the claims may be varied to include the specific elements listed in this paragraph or any combination of these specific elements:

A) Perfluoroelastomers

Perfluoroelastomers described herein are perfluorinated and may include copolymerized monomer units of tetrafluoroethylene, hexafluoropropylene, and mixtures of these; one or more perfluorovinyl ether monomers selected from the group consisting of perfluoro (alkyl vinyl) ethers, perfluoro (alkoxy vinyl) ethers, and mixtures of these; and a cure site monomer. Perfluoroelastomers A described herein are perfluorinated and comprise at least the following three copolymerized monomer units: A (1) about 25 to 74.9 mole percent of tetrafluoroethylene, hexafluoropropylene, and mixtures of these: A (2) about 25 to 74.9 mole percent of one or more of perfluoro (alkyl vinyl) ethers, perfluoro (alkoxy vinyl) ethers, and mixtures of these; and A (3) about 0.1 to 10 mole percent of one or more cure site monomers: wherein the mole percent of each of A (1), A (2), and A (3) is based on the total mole percent of A (1), A (2), and A (3) in perfluoroelastomer A.

A (2) Perfluoro Vinyl Ethers

Suitable perfluorovinyl ether monomers described herein include perfluoro (alkyl vinyl) ether and perfluoro (alkoxy vinyl) ether monomers and include those selected from any one of formula (II), (III), (IV), (V) or (VI) herein below.

$$CF_2=CFO(R_fO)_n(R_{f'}O)_mR_{f''} \qquad (II),$$

where $R_f$, and $R_{f'}$ are linear or branched perfluoroalkylene groups of 2-6 carbon atoms, m and n are independently 0-10, and $R_{f''}$ is a perfluoroalkyl group of 1-6 carbon atoms.

$$CF_2=CFO(CF_2CFXO)_nR_f \qquad (III),$$

where X is F or $CF_3$, n is 0-5, and $R_f$ is a perfluoroalkyl group of 1-6 carbon atoms. Preferably, n is 0 or 1 and $R_f$ contains 1-3 carbon atoms. Examples of such fluorovinyl ether monomers include perfluoro(methyl vinyl) ether and perfluoro(propyl vinyl) ether.

$$CF_2=CFO[(CF_2)_mCF_2CFZO]_nR_f \quad (IV),$$

where $R_f$ is a perfluoroalkyl group having 1-6 carbon atoms, m=0 or 1, n=0-5, and Z=F or $CF_3$.

$$CF_2=CFO[(CF_2CFCF_3O)_n(CF_2CF_2CF_2O)m(CF_2)_p]C_xF_{2x+1} \quad (V),$$

where m and n=1-10, p=0-3, and x=1-5 and includes monomers where n=0-1, m=0-1, and x=1.

$$CF_2=CFOCF_2CF(CF_3)O(CF_2O)_mCF_{2n+1} \quad (VI),$$

where n=1-5, m=1-3, and where, preferably, n=1.

The concentration of perfluoro (alkyl vinyl) ether or perfluoro (alkoxy vinyl) ether monomers, or a combination of these, in the perfluoroelastomer compounds ranges from 0.01 to 100 phr, preferably at least about 1 to 30 phr, and more preferably from about 5 to 30 phr.

A(3) Cure Site Monomer

Perfluoroelastomer A further includes copolymerized units of one or more cure site monomers A(3). Suitable cure site monomers include perfluorinated olefins that comprise a functional group in the molecule selected from the group consisting of nitrile groups, bromine atoms, and iodine atoms, with nitrile groups being preferred.

Suitable nitrile-containing cure site monomers A(3) include compounds of formula $$CF_2=CF-O(CF_2)_n-CN \quad (VII),$$

where n=2-12, preferably 2-6;

$$CF_2=CF-O[CF_2-CFCF_3-O]_n-CF_2-CFCF_3-CN \quad (VIII),$$

where n=0-4, preferably 0-2;

$$CF_2=CF-[OCF_2CFCF_3]_x-O-(CF_2)_n-CN \quad (IX),$$

where x=1-2, and n=1-4;
and $$CF_2=CF-O-(CF_2)_n-O-CF(CF_3)CN \quad (X),$$

where n=2-4.

Especially preferred cure site monomers comprising a nitrile group include perfluorinated polyethers having a nitrile group and a trifluorovinyl ether group. A most preferred cure site monomer is perfluoro(8-cyano-5-methyl-3,6-dioxa-1-octene) (8-CNVE) represented by formula (XI):

$$CF_2=CFOCF_2CF(CF_3)OCF_2CF_2CN \quad (XI)$$

Examples of cure site monomers comprising a bromine atom include bromotrifluoroethylene; 4-bromo-3,3,4,4-tetrafluorobutene-1 (BTFB); vinyl bromide; 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1; 3,3-difluoroallyl bromide; 2-bromo-perfluoroethyl perfluorovinyl ether and fluorinated compounds represented by formula (XII):

$$CF_2BrRf-OCF=CF_2 \quad (XII)$$

where $R_f$ is a perfluoroalkylene group. Additional examples of cure site monomers comprising a bromine atom include $CF=CFOCF_2CF_2CF_2OCF_2CF_2Br$ and $CF_2BrCF_2O$-$CF=CF_2$ as well as cure site monomers represented by formulas (XIII) and (XIV):

$$ROCF=CFBr \quad (XV) \text{ and}$$

$$ROCBr=CF_2 \quad (XIV)$$

where R is a $C_1$ to $C_6$ alkyl group or fluoroalkyl group. Specific examples include $CH_3OCF=CFBr$ and $CF_3CH_2OCF=CFBr$.

Suitable cure site monomers comprising iodine atoms include those represented by formula (XV):

$$CHR=CHZ-CH2CHR\ I \quad (XV)$$

where R is H or $-CH_3$ and Z is a $C_1$-$C_{18}$ perfluoroalkyl radical which can be linear or branched and optionally containing one or more ether oxygen atoms. Additional examples of useful iodinated cure site monomers are unsaturated ethers represented by formulas (XVI) and (XVII):

$$I(CH_2CF_2CF_2)_nOCF=CF_2 \quad (XVI)$$

$$ICH_2CF_2O[CF(CF_3)CF_2O]_nCF=CF_2 \quad (XVII)$$

wherein n=1-3.

Further examples of cure site monomers comprising iodine atoms include iodoethylene; 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3-hexafluoro-2-iodo-1-(perfluorovinyloxy)propane; 2-iodo-ethyl vinyl ether; 3,3,4,5,5,5-hexafluoro4-iodopentene; iodotrifluoroethylene; allyl iodide, and 2-iodo-perfluoroethyl perfluorovinyl ether.

The perfluoroelastomer may comprise any of a variety of end groups as a result of the use of varying initiators or chain transfer agents during polymerization. Non-limiting examples of end groups include sulfonate, sulfonic acid, carboxylate, carboxylic acid, carboxamide, difluoromethyl groups, trifluorovinyl groups, or perfluorinated alkyl groups.

B) Carbon Black

Carbon black is known to balance modulus, tensile strength, elongation, hardness, abrasion resistance, conductivity, and processability of polymer compositions. In the perfluoroelastomer compounds described herein, at least one carbon black having a particle size of at least 60 nm is present in the perfluoroelastomer compound. The particular carbon blacks useful in the perfluoroelastomer compositions described herein are those characterized by large average particle size. By large average particle size it is meant that the typical average particle size is at least about 60 nm to about 500 nm, as determined by ASTM D-3849. Carbon blacks having average particle sizes in this range are graded at the upper end of Group No. 7 (average particle size 61-100 nm) and in Groups No. 8 (average particle size 101-200 nm) and 9 (average particle size 201-500 nm) of ASTM D-1765, the classification system for carbon blacks used in rubber products. Preferred carbon blacks have average particle sizes at the upper end of the range, generally from at least about 150 nm to about 500 nm. The most preferred carbon blacks have average particle sizes of at least about 200 nm. Examples of such carbon blacks are MT blacks (medium thermal black) designated N-991, N-990, N-908, and N-907, and large particle size furnace blacks. MT blacks are preferred. The concentration of carbon black in the perfluoroelastomer compounds described herein ranges from about 10 to 100 phr, preferably from about 20 to 50 phr.

C) Mineral Filler

The perfluoroelastomer compounds described herein also comprise a mineral filler selected from the group consisting of titanium dioxide, barium sulfate, or a mixture of these.

Titanium dioxide may also be described as titanium oxide and has the formula $TiO_2$. Examples of titanium dioxide include Ti-Pure™ R-101 available from Chemours and Pigment White 6.

Barium sulfate is an inorganic material with the chemical formula $BaSO_4$. Examples of barium sulfate include Blanc Fixe available from Solvay Chemicals, and Huberbrite® available from Huber Engineering Materials. The concentration of mineral filler(s) in the perfluoroelastomer compound described herein ranges from about 1 to 35 phr, preferably from about 2 to 30 phr, and more preferably from about 4 to 25 phr.

D) Curing Agent

Curing agents for the perfluoroelastomer compounds described herein include any compound that can produce the cross-link as a heterocyclic structure or fully fluorinated hydrocarbon. More specifically, the curing agent can be, carbohydrazide, isophthalic dihydrazide, t-butyl carbazate, or oxalydihydrazide. The concentration of curing agent ranges from about 0.1 to 10 phr, preferably 0.5 to 5 phr.

E) Optional Co-agent

If peroxide cured, the perfluoroelastomer compounds described herein may include one or more optional co-agents, which include, but are not limited to, dibromopropyl isocyanurate, tri(methyl)allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(dial-lylamine)-s-triazine, triallyl phosphite, 1,2-polybutadiene, ethyleneglycol diacrylate, and diethyleneglycol diacrylate. Other co-agents may have the formula (XVIII):

$$CH_2=CH-R^4-CH=CH_2 \quad\quad (XVIII),$$

wherein $R^4$ may be a perfluoro alkylene of 1 to 8 carbon atoms.

The concentration of one or more co-agents, when present, ranges from about 0.1 to 10 phr, preferably 0.5 to 5 phr.

Additives

The perfluoroelastomer compounds described herein may include one or more additives, such as stabilizers, plasticizers, lubricants, and processing aids, which are typically utilized in fluoroelastomer compounding, when these retain adequate stability for the intended use. In particular, perfluoropolyethers can enhance low temperature performance. The concentration of additives in these perfluoroelastomer compounds ranges from 0.01 to 100 phr, preferably at least about 1 to 30 phr, and more preferably from about 5 to 30 phr.

Tetrafluoroethylene polymers used as additives in the compounds described herein include copolymers of TFE having sufficient concentrations of copolymerized units of one or more monomers to reduce the melting point below that of PTFE. Such copolymers generally have melt viscosity in the range of $0.5-60 \times 10^3$ Pa·s, but viscosities outside this range are also known.

Preparing Perfluorinated Compounds Described Herein and Curing Articles Described Herein that Comprised these Perfluorinated Compounds The perfluorinated compounds described herein may be prepared by mixing until homogeneous perfluoroelastomer, carbon black, mineral filler, curing agent, and optional additives and co-agents, when present, using rubber compounding procedures such as a two roll rubber mill, an internal mixer, for example, a Banbury internal mixer, or in an extruder.

The perfluoroelastomer compounds described herein may be cured by the application of heat and/or of pressure sufficient to cause the curing agent(s) to form crosslinks with cure site monomer(s). A dual cure system may also be used to cure the compounds. When compression molding is used to cure, a press cure cycle is preferably followed by a post cure cycle during which the press cured compound is heated at elevated temperatures in excess of 300° C. for several hours in an inert atmosphere such as nitrogen or argon. The compounds described herein, when cured, become articles described herein and exhibit useful and suitable thermal stability, chemical resistance, and compression stress relaxation for the applications in which these articles are used. These articles are particularly useful as seals and gaskets for high temperature applications and in a broad range of chemical environments, and in seals for high temperature automotive uses, and as O-rings.

Sealing force is measured by compression stress relaxation testing of articles in the form of O-rings described herein. The perfluoroelastomer compounds described herein, when cured in the form of O-rings, exhibit a sealing force of at least 20 N when measured at 90° C. after 1500 hrs exposure in water at 225° C. and 20 percent compression using Wykeham-Farrence testing equipment.

EXAMPLES

The exemplary perfluoroelastomer compounds identified by "E" in the tables below are intended only to further illuminate and not to limit the scope of compounds, processes, and articles described and recited herein. Comparative examples are identified in the tables below by "C".

Materials

In the compounds, processes, and articles exemplified in the tables below, the following materials were used:

FFKM (perfluoroelastomer A): a perfluoroelastomer prepared from 48.8 wt. % units of TFE, 49.0 wt. % units of perfluoro(methyl vinyl) ether (PMVE) and 2.2 wt. % units of 8-CNVE. Fluoroelastomer A can be prepared by the process disclosed in U.S. Pat. No. 5,789,489, col. 10 to 11.

Curing Agent: Oxalydihydrazide

Carbon Black: a thermal carbon black filler having an average particle size of 280 nm, available as Thermax® N990 from Cancarb.

Magnesium oxide: available as Maglite® D from Hallstar, OH, USA.

Titanium dioxide: available as TiPure™ R101 from Chemours, DE, USA.

Barium Sulfate: available as blanc fixe XRHN from Taber Incorporated.

Zinc oxide: 99% Zinc oxide available from Alfa Aesar, Havehill, MA, USA

Methods

In the perfluoroelastomer compounds, processes, and articles exemplified in the tables below, the following methods were used:

Specific Process for Preparing Articles Described Herein

The following specific process may be used to prepare articles described herein from perfluoroelastomer compounds described herein. A sheet of perfluoroelastomer compound was extruded on a roll mill to a thickness of about 2 mm. One-inch diameter circular washers were punched out of the extruded sheet. If the one-inch circular washer weighs less than 2.5 g, the sheet is re-extruded with a wider gap in the nip roll until a punched test sample is at least 2.5 g.

Circular washer test samples of the compound were used to prepare O-rings by the following cure process.

Standard 214 O-rings (3 cm×0.34 cm) were compression molded from the circular washer test samples in an 8"×8" PHI press using max. 35000 psi pressure at 199° C. for TC90 plus 5 minutes. The O-ring samples were further cured, i.e., post-cured, by heating at elevated temperatures in excess of 300° C. for several hours in an inert atmosphere. The O-rings were used for compression stress relaxation testing with the results shown in Tables 1 and 2.

Determination of Sealing Force by Compression Stress Relaxation Testing

O-rings (3 cm×0.34 cm), prepared as described herein, were exposed to distilled water at 225° C. for 24, 504, 1008, and 1512 hours while being compressed to 20% using Wykeham-Farrence equipment. After each time period, O-rings were tested for sealing force at 90° C. as per Tuckner, Paul, *Fall Technical Meeting of the Rubber Division*, American Chemical Society, 182nd, Cincinnati, OH, United States, Oct. 9-11, 2012 Volume3 Pages 1550-1572.

The percent retention of sealing force of the O-rings comprising the perfluoroelastomer compounds described herein are compared to an identical perfluoroelastomer compound lacking an inorganic filler. The percent retention of sealing force of the O-rings comprising the perfluoroelastomer compounds described herein are also compared to an identical perfluoroelastomer compound comprising a different inorganic filler. O-rings prepared from perfluoroelastomer compounds which do not comprise an inorganic filler are used as the control.

In all comparisons, 24 hrs was used as the baseline sealing force of the O-rings rather than 0 hrs. This provides a more accurate measurement of sealing force retention since at time zero the O-rings may not have reached a steady state of relaxation.

The data in Table 1 was obtained for samples exposed at 225° C. in distilled water using Wykeham-Farrence equipment with the O-rings under 20% compression. After exposure for the desired time period, the O-rings were removed from the Wykeham-Farrence equipment and sealing force of the O-rings was determined at 90° C. using the method of Paul Tuckner. C1 is the control (exposure for 24 hrs to distilled water at 225° C. and 20% compression) for the data in Table 1 and does not comprise an inorganic filler. The O-rings were then exposed to water at 225° C. for time periods of 504 hrs, 1008 hrs, and 1500 hrs exposure and the sealing force measured at 90° C. after each time period.

TABLE 1

| COMPONENTS (PHR*) | C1 | C2 | C3 | E1 | E2 |
|---|---|---|---|---|---|
| FFKM | 100 | 100 | 100 | 100 | 100 |
| Carbon Black | 50 | 40 | 40 | 40 | 40 |
| Magnesium oxide | | 5 | | | |
| Titanium dioxide | | | | 5 | |
| Barium sulfate | | | | | 5 |
| Zinc oxide | | | 5 | | |
| Curing Agent | 0.89 | 0.89 | 0.89 | 0.89 | 0.89 |
| Physical Properties | | | | | |
| Sealing Force (N) | | | | | |
| 0 hrs | 516 | 372 | 472 | 476 | 456 |
| 24 hrs | 256 | 71 | 167 | 269 | 271 |
| 504 hrs | 108 | 4 | 53 | 168 | 155 |

TABLE 1-continued

| COMPONENTS (PHR*) | C1 | C2 | C3 | E1 | E2 |
|---|---|---|---|---|---|
| 1008 hrs | 60 | 1 | 10 | 73 | 67 |
| 1512 hrs | 35 | 2 | 6 | 46 | 48 |
| % retention of sealing force after 1488 hrs[1] | 13.7 | 2.8 | <1 | 17.1 | 17.7 |
| % improvement in sealing force retention vs. control (C1)[2] | N/A | decrease | decrease | 25 | 29 |

[1,2] using 24 hrs as baseline

The data in Table 1 shows that after 504 hours of exposure to distilled water at 225° C. all the examples and comparative examples had a drop in sealing force with C2 and C3, comprising magnesium oxide and zinc oxide as mineral fillers respectively, exhibiting the greatest decrease in sealing force with values of 4 and 53 N. E1 and E2 retained the highest sealing force of 168 and 155 N respectively. After 1512 hours, all the comparative examples exhibited a sealing force value of 35 N or less. Only examples E1 and E2 exhibited a sealing force value greater than 40 N after 1512 hrs of exposure to distilled water at 225° C. This represents a minimum 25 percent improvement in sealing force retention verses C1 (control) with E1 having a percent retention of sealing force after 1488 hrs of 17.1 percent and C1 having a percent retention of sealing force of 13.7 percent.

The data in Table 1 also shows that E1 and E2 show superior retention of sealing force vs the comparative examples which comprised different mineral fillers after exposure to distilled water at 225° C. for various time periods. All the examples and comparative examples had a significant drop in percent retention of sealing force after 1512 hrs with C2 and C3 exhibiting the greatest decrease in retention of sealing force after exposure for 1512 hrs. E1 and E2 exhibited the highest percent retention of sealing force during the same time period of 17.1 and 17.7 percent respectively. Of the comparative examples, C1 exhibited the best percent retention of sealing force at 13.7 percent. Examples E1 and E2 exhibit a minimum 25 percent improvement in sealing force retention verses the control (C1).

These results show that the perfluoroelastomer compounds described herein, when cured, exhibit superior retention of sealing force when tested up to 1512 hours, compared to sealing force values for an identical compound except a mineral filler other than titanium dioxide or barium sulfate is used as the mineral filler or when no mineral filler is used. Magnesium oxide and zinc oxide are all examples of typical fillers used in polymer compositions. However, the data in Table 1 clearly shows the unexpected improvement in percent retention of sealing force of perfluoroelastomer compounds when the specific combination of titanium dioxide or barium sulfate is used as the inorganic filler in combination with a specific type and size of carbon black. The fact that only inorganic fillers titanium dioxide and barium sulfate in combination with specific carbon blacks provide superior retention of sealing force compared to other inorganic fillers is surprising and unexpected.

TABLE 2

| COMPONENTS (PHR*) | C4 | C5 | E3 | E4 |
|---|---|---|---|---|
| FFKM | 100 | 100 | 100 | 100 |
| Carbon Black | 50 | | 25 | 25 |
| Titanium dioxide | | | 25 | |

TABLE 2-continued

| COMPONENTS (PHR*) | C4 | C5 | E3 | E4 |
|---|---|---|---|---|
| Barium sulfate | | 50 | | 25 |
| Curing Agent | 0.89 | 0.89 | 0.89 | 0.89 |
| Physical Properties | | | | |
| Sealing Force (N) | | | | |
| 0 hrs | 532 | 250 | 321 | 355 |
| 24 hrs | 271 | 95 | 159 | 171 |
| 504 hrs | 73 | 22.2 | 75.1 | 71 |
| 1176 hrs | 18.9 | 2.85 | 40.2 | 21.2 |
| % retention of sealing force after 1152 hrs[1] | 7 | decrease | 25.3 | 12.4 |
| % improvement in sealing force retention vs. control (C4)[2] | N/A | decrease | 261 | 77 |

[1, 2]starting at 24 hrs

Table 2 shows the effect that higher concentrations of mineral filler have on the retention of sealing force of O-rings comprising the cured perfluoroelastomer compounds described herein after the O-rings have been exposed to distilled water at 225° C. and 20 percent compression for various time periods. C4 comprises carbon black with no mineral filler and is the control for the experiments in Table 2. C5 comprises no carbon black but comprises 50 phr of barium sulfate. E3 and E4 comprise equal parts carbon black and mineral filler (25:25). E3, comprising 25 phr titanium dioxide, exhibits a 261 percent improvement in sealing force retention compared to C4. E4, comprising 25 phr barium sulfate, exhibits a 77 percent improvement in sealing force retention compared to C4. C5 shows that the use of barium sulfate at 50 phr in the absence of carbon black, does not provide O-rings having desirable sealing force retention after 1176 hrs exposure to distilled water at 225° C.

It is important to compare examples and comparative examples with the control for that experiment, the control being a perfluoroelastomer composition identical to the composition of the examples except the control does not comprise a mineral filler. In other words, all the examples and comparative examples as well as the control should only be compared to examples and comparative examples which were run at the same time under the same experimental conditions. The results in Table 1 should only be compared to the control (C1) in Table 1 and the results in Table 2 should only be compared to the control (C4) in Table 2 to determine the percent improvement in sealing force retention.

What is claimed is:

1. A curable perfluoroelastomer compound comprising:
   A. a perfluoroelastomer comprising copolymerized units of:
      (1) tetrafluoroethylene, hexafluoropropylene, or a mixture of these;
      (2) at least one perfluoro(alkyl vinyl) ether, perfluoro(alkoxy vinyl) ether, or a mixture of these; and
      (3) one or more cure site monomers comprising a functional group selected from the group consisting of nitrile groups, bromine atoms, and iodine atoms;
   B. from 10 to 100 phr of at least one carbon black having a particle size of at least 60 nm;
   C. from 1 to 35 phr of a mineral filler, wherein the mineral filler is barium sulfate; and
   D. a curing agent, wherein the curing agent is selected from the group consisting of oxalyl dihydrazide, carbohydrazide, isophthalic dihydrazide, and t-butyl carbazate;
   wherein said perfluoroelastomer compound in the shape of an O-ring, after curing and exposure to distilled water at 225° C. under 20 percent compression for 1500 hours using Wykeham-Farrence testing equipment, exhibits a sealing force retention measured at 90° C. which is at least 25 percent greater than an identical perfluoroelastomer compound lacking said mineral filler.

2. The perfluoroelastomer compound of claim 1, wherein the cure site monomer comprises a nitrile group.

3. The perfluoroelastomer compound of claim 1, wherein the cure site monomer is a nitrile-containing perfluorinated vinyl ether.

4. The perfluoroelastomer compound of claim 1, wherein the carbon black has a particle size of at least 100 nm.

5. An article comprising the cured perfluoroelastomer compound of claim 1.

6. The article of claim 5 in the form of a gasket, seal, tubing, diaphragm, or O-ring.

7. A process for preparing the perfluoroelastomer compound of claim 1, comprising the step of:
   1) mixing a perfluoroelastomer compound that comprises:
      A. a perfluoroelastomer comprising copolymerized units of:
         (1) tetrafluoroethylene, hexafluoropropylene, or a mixture of these;
         (2) at least one perfluoro(alkyl vinyl) ether, perfluoro(alkoxy vinyl) ether, or a mixture of these; and
         (3) one or more cure site monomers comprising a functional group selected from the group consisting of nitrile groups, bromine atoms, and iodine atoms;
      B. from 10 to 100 phr of at least one carbon black having a particle size of at least 60 nm;
      C. from 1 to 35 phr of a mineral filler, wherein the mineral filler is barium sulfate; and
      D. a curing agent, wherein the curing agent is selected from the group consisting of oxalyl dihydrazide, carbohydrazide, isophthalic dihydrazide, and t-butyl carbazate.

* * * * *